United States Patent
Cwiertny et al.

(10) Patent No.: US 12,509,371 B2
(45) Date of Patent: Dec. 30, 2025

(54) ELECTRODE FOR NITRATE REDUCTION

(71) Applicants: UNIVERSITY OF IOWA RESEARCH FOUNDATION, Iowa City, IA (US); BOARD OF REGENTS, THE UNIVERSITY OF TEXAS SYSTEM, Austin, TX (US)

(72) Inventors: David Cwiertny, Iowa City, IA (US); Syed Mubeen Jawahar Hussaini, Iowa City, IA (US); Ashley Hesterberg Butzlaff, Iowa City, IA (US); Charles Werth, Austin, TX (US); Chenxu Yan, Austin, TX (US)

(73) Assignees: UNIVERSITY OF IOWA RESEARCH FOUNDATION, Iowa City, IA (US); BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 18/870,256

(22) PCT Filed: Jun. 1, 2023

(86) PCT No.: PCT/US2023/024192
§ 371 (c)(1),
(2) Date: Nov. 27, 2024

(87) PCT Pub. No.: WO2023/235516
PCT Pub. Date: Dec. 7, 2023

(65) Prior Publication Data
US 2025/0162906 A1    May 22, 2025

Related U.S. Application Data

(60) Provisional application No. 63/347,801, filed on Jun. 1, 2022.

(51) Int. Cl.
*C02F 1/46* (2023.01)
*C02F 1/461* (2023.01)
(Continued)

(52) U.S. Cl.
CPC ........ *C02F 1/46109* (2013.01); *C02F 1/4676* (2013.01); *C02F 2001/46142* (2013.01);
(Continued)

(58) Field of Classification Search
CPC ............... C02F 1/46109; C02F 1/4676; C02F 2001/46142; C02F 2001/46157; C02F 2101/163; C02F 2103/26; C02F 2103/34
See application file for complete search history.

(56) References Cited

U.S. PATENT DOCUMENTS

| | | |
|---|---|---|
| 2011/0052467 A1 | 3/2011 | Chase et al. |
| 2013/0063867 A1 | 3/2013 | Naoi et al. |

(Continued)

FOREIGN PATENT DOCUMENTS

WO    1999058452 A2    11/1999

OTHER PUBLICATIONS

Patent Cooperation Treaty, International Search Report and Written Opinion for PCT/US2023/024192, 11 pages, dated Aug. 30, 2023.

*Primary Examiner* — Zulmariam Mendez
(74) *Attorney, Agent, or Firm* — Viksnins Harris Padys Malen LLP (57) ABSTRACT

A nitrate-reducing electrode, and methods of making the nitrate-reducing electrode are disclosed. The nitrate reducing electrode includes catalyst particulates disposed on water permeable substrates with the use of electrodeposition, electroless deposition, electrospinning, or thermal treatment. The catalyst particles include metals and metal (Continued)

oxides. The water permeable substrates are preferably made of carbonaceous materials using electrospinning and thermal treatment.

8 Claims, 8 Drawing Sheets

(51) Int. Cl.
*C02F 1/467* (2023.01)
*C02F 101/16* (2006.01)
*C02F 103/26* (2006.01)
*C02F 103/34* (2006.01)

(52) U.S. Cl.
CPC ............... *C02F 2001/46157* (2013.01); *C02F 2101/163* (2013.01); *C02F 2103/26* (2013.01); *C02F 2103/34* (2013.01)

(56) References Cited

U.S. PATENT DOCUMENTS

2015/0243451 A1    8/2015   Kim et al.
2020/0353424 A1*   11/2020   Ale Ebrahim ............ C02F 1/32

* cited by examiner

ELECTRODE FOR NITRATE REDUCTION

RELATED APPLICATION

This application claims priority to U.S. Provisional Application No. 63/347,801 that was filed on Jun. 1, 2022. The entire content of the application referenced above is hereby incorporated by reference herein.

FEDERALLY SPONSORED RESEARCH

This invention was made with government support under 1705255 awarded by the National Science Foundation. The government has certain rights in the invention.

FIELD OF THE INVENTION

The present invention relates to electrode assemblies for use in electrolytic devices. In particular, the present invention relates to methods of making catalyst particulates deposited on water permeable carbonaceous substrates for use in a nitrate reduction reaction.

BACKGROUND OF THE INVENTION

Nitrate is the world's most ubiquitous groundwater pollutant primarily from agricultural fertilizer and changing land use. The go-to technology for nitrate removal from drinking water is ion exchange which removes and concentrates nitrate from the waters. Currently, ion exchange is economically and environmentally unsustainable as it requires expensive concentrate management options such as deep well injection to dispose waste nitrate brines. Converting captured nitrates to benign molecule such as dinitrogen or to a valuable commodity molecule such as ammonia would be a more sustainable solution. Such a solution typically will require catalysts disposed on high-surface area supports for efficient and selective conversion.

An electrolytic device uses electricity to catalytically convert reactants to benign or value-added products. It typically contains a membrane disposed between an anode (oxidizing electrode) and cathode (reducing electrode), which are correspondingly disposed between a pair of diffusers for product removal. In an electrolytic nitrate reduction process, nitrate-rich waters are introduced into the cathode portion, where nitrate reacts with protons and electrons to form nitrogen or ammonia and water. The water transports through the membrane and reacts with the anode to form oxygen and electrons, completing the circuit. A common obstacle in the commercial application of electrolytic nitrate reduction is the performance of the nitrate-reducing electrode. There currently exists no nitrate-reducing electrode that performs satisfactorily when it comes to selectivity and efficiency. A major challenge is the large voltages needed to efficiently transform nitrates to nitrogen or ammonia. To minimize the voltage requirement highly efficient catalysts need to be disposed on high surface area substrates that are water permeable and highly electrically conductive. As such there is a need for alternative catalyst materials and substrates and methods of integrating them as nitrate reducing electrodes, that provide advantages in terms of performance and cost.

SUMMARY

Consistent with the disclosed embodiments, a nitrate-reducing electrode is disclosed. The nitrate-reducing electrode includes a carbonaceous water permeable substrate having a titanium compound and a metal catalyst disposed thereon or therein. In some embodiments, the titanium compound comprises titanium dioxide. In some embodiments, the metal catalyst is disposed on the carbonaceous water permeable substrate using electrodeposition, electroless deposition, electrospinning, or thermal treatment. In some embodiments, the carbonaceous water permeable substrate is prepared or is preparable using electrospinning or thermal treatment. In some embodiments, the nitrate-reducing electrode comprises carbon nanofibers (CNFs) or composites of carbon nanofibers that function as a flexible electrode material that serves as a framework for catalyst implementation. In some embodiments, the CNF composites contain embedded titanium compounds and carbon nanomaterials or carbon nanotubes. In some embodiments, the nitrate-reducing electrode exhibits a specific surface area greater than about forty meters squared per gram. In some embodiments, the nitrate-reducing electrode exhibits high chemical stability. In some embodiments, the nitrate-reducing electrode exhibits high permeability. In some embodiments, the nitrate-reducing electrode exhibits high mechanical strength. In some embodiments, the nitrate-reducing electrode is conductive. In some embodiments, the metal catalyst comprises a noble metal. In some embodiments, the metal catalyst comprises rhenium, ruthenium, rhodium, palladium, silver, osmium, iridium, platinum, and gold. In some embodiments, the metal catalyst does not comprise a noble metal. In some embodiments, the metal catalyst does not comprise rhenium, ruthenium, rhodium, palladium, silver, osmium, iridium, platinum, and gold. In some embodiments, the metal catalyst comprises copper.

Consistent with the disclosed embodiments, a method is disclosed. The method comprises contacting a sample that comprises a pollutant selected from a nitrate and a nitrite with a nitrate-reducing electrode, under conditions where some or all of the pollutant is removed from the sample. In some embodiments the composition of the electrode is tuned to influence the yield of products generated during nitrate reduction. In some embodiments, the composition of the electrode is tuned to yield ammonia from reduction of the nitrate or the nitrite. In some embodiments, the sample comprises agricultural wastewater or industrial wastewater.

Consistent with the disclosed embodiments a method is disclosed. The method comprises heating a carbonaceous water permeable substrate having a titanium compound and a metal catalyst disposed thereon or therein to increase oxygen vacancies (OVs). In some embodiments, the titanium compound comprises titanium dioxide. In some embodiments, the carbonaceous water permeable substrate having a titanium compound and a metal catalyst disposed thereon or therein is heated to a temperature in the range of from about 400° C. to about 700° C. In some embodiments, the carbonaceous water permeable substrate having a titanium compound and a metal catalyst disposed thereon or therein is heated in a reducing atmosphere that comprises $H_2$. In some embodiments, about 25% to about 75% by weight of the carbonaceous water permeable substrate having a titanium compound and a metal catalyst disposed thereon or therein is the titanium compound. In some embodiments, the metal catalyst comprises a noble metal. In some embodiments, the metal catalyst does not comprise a noble metal. In some embodiments, the metal catalyst comprises copper. In some embodiments, the method further comprises preparing the carbonaceous water permeable substrate having the titanium compound and the metal catalyst disposed thereon or therein by electrospinning polymer fibers to provide a water permeable substrate that comprises electro spun nanofibers and that has the titanium compound disposed thereon or therein; oxidatively stabilizing the electro spun nanofibers to provide the water permeable substrate that comprises oxidatively stabilized electro spun nanofibers and that has the titanium compound disposed thereon or therein; heating the water permeable substrate that comprises oxidatively stabilized electro spun nanofibers and that has the titanium compound disposed thereon or therein to provide the carbonaceous water permeable substrate having the titanium compound disposed thereon or therein; and depositing the metal catalyst onto the carbonaceous water permeable substrate having the titanium compound disposed thereon to provide the carbonaceous water permeable substrate having the titanium compound and the metal catalyst disposed thereon or therein. In some embodiments, the polymer fibers are derived from a sol-gel comprising the titanium compound, a polymer precursor, and a suspending solvent. In some embodiments, the sol-gel comprises polyacrylonitrile. In some embodiments, the sol-gel comprises phthalic acid. In some embodiments, the sol-gel comprises multi-walled carbon nanotubes. In some embodiments, the nanofibers are oxidatively stabilized by heating in air at about 250° C. In some embodiments, the water permeable substrate that comprises oxidatively stabilized electro spun nanofibers is heated to a temperature in the range of about 800° C. to about 1200° C. to provide the carbonaceous water permeable substrate having the titanium compound disposed thereon or therein. In some embodiments, the metal catalyst is deposited onto the carbonaceous water permeable substrate having the titanium compound disposed thereon by electrodeposition.

In some embodiments, the metal catalyst is electrochemically deposited using a three-electrode system at room temperature, where the carbonaceous water permeable substrate is the working electrode, Ag/AgCl is the reference electrode, and a platinum wire is the counter electrode. In some embodiments, the method further comprises preparing a nitrate-reducing electrode that comprises the carbonaceous water permeable substrate having the titanium compound and the metal catalyst disposed thereon or therein.

Consistent with the disclosed embodiments a method is disclosed. The method comprises preparing a water permeable substrate that comprises electro spun nanofibers and that has a titanium compound disposed thereon or therein by electrospinning polymer fibers from a sol-gel comprising the titanium compound, a polymer precursor, and a suspending solvent to provide the water permeable substrate that comprises electro spun nanofibers and that has the titanium compound disposed thereon or therein. The method further comprises oxidatively stabilizing the electro spun nanofibers by heating in air at about 250° C. to provide the water permeable substrate that comprises oxidatively stabilized electro spun nanofibers and that has the titanium compound disposed thereon or therein. The method further comprises heating the water permeable substrate that comprises oxidatively stabilized electro spun nanofibers and that has the titanium dioxide disposed thereon or therein to a temperature in a range of about 800° C. to about 1200° C. to carbonize the oxidatively stabilized nanofibers and to provide the carbonaceous water permeable substrate having the titanium compound disposed thereon or therein. The method further comprises depositing a metal catalyst onto the carbonaceous water permeable substrate having the titanium compound disposed thereon to provide the carbonaceous water permeable substrate having the titanium compound and the metal catalyst disposed thereon or therein. The method further comprises heating the carbonaceous water permeable substrate having the titanium compound and the metal catalyst disposed thereon or therein to increase oxygen vacancies to provide the carbonaceous water permeable substrate having increased oxygen vacancies and having the titanium compound and the metal catalyst disposed thereon or therein. And the method further comprises incorporating the carbonaceous water permeable substrate having increased oxygen vacancies and having the titanium compound and a metal catalyst disposed thereon or therein into an electrode. In some embodiments, the polymer precursor comprises polyacrylonitrile.

Consistent with the disclosed embodiments, a method is disclosed. The method comprises forming a carbonaceous water permeable substrate having a titanium compound and a metal catalyst disposed thereon or therein. The method further comprises introducing oxygen vacancies into the carbonaceous water permeable substrate. In some embodiments, the method further comprises forming the carbonaceous water permeable substrate having the titanium compound and the metal catalyst disposed thereon or therein and heat treating the carbonaceous water permeable substrate having the titanium compound and the metal catalyst disposed thereon or therein.

Consistent with the disclosed embodiments, a method is disclosed. The method comprises treating wastewater using a nitrate-reducing electrode. In some embodiments, the wastewater comprises agricultural wastewater. In some embodiments, the wastewater comprises industrial wastewater.

BRIEF DESCRIPTION OF THE DRAWINGS

FIG. 1A, FIG. 1B and FIG. 1C: SEM images of CNF supports carbonized at 1000° C.: (A) CNF, (B) CNF/$TiO_2$, and (C) CNF/CNT. Values in high-magnification SEM images represent mean fiber diameter and standard deviation (n=85). Values in cross-sectional images represent mean thickness and standard deviation (n=6). Distance between arrows identifies the electrode thickness as measured.

DETAILED DESCRIPTION

A detailed description of one or more embodiments of the invention is provided below. The invention is described in connection with such embodiments, but the invention is not limited to any embodiment. The scope of the invention is not limited by these embodiments, and the invention encompasses numerous alternatives, modifications, and equivalents. Numerous specific details are set forth in the following description in order to provide a thorough understanding of the invention. These details are provided for the purpose of example, and the invention may be practiced without some or all of these specific details. For the purpose of clarity, technical material that is known in the technical fields related to the invention has not been described in detail so that the invention is not unnecessarily obscured.

As used herein, the term "about" means±10/o of the stated value.

As used herein, the term "disposed thereon" includes materials wherein a titanium compound, such as titanium dioxide, for example, is associated with or on the surface of electro spun nanofibers.

As used herein, the term "disposed therein" includes materials wherein a titanium compound, such as titanium dioxide, for example, is incorporated within electro spun nanofibers.

This specification discloses the effect of a monometallic catalyst support on the electrocatalytic nitrate reduction reaction (NO3RR) via the systematic design, characterization, and performance assessment of three carbon nanofiber (CNF) electrodes fabricated via electrospinning. The three CNF supports evaluated were pure CNFs carbonized from polyacrylonitrile (PAN), a CNF composite with embedded titanium dioxide nanoparticles ($CNF/TiO_2$), and a CNF composite with embedded carbon nanotubes (CNF/CNTs). $TiO_2$ composite was chosen because of demonstrated example of superior nitrate adsorption on $TiO_2$ when oxygen vacancies are introduced. There is also growing evidence in the literature that depositing a metal catalyst onto reducible oxides such as $TiO_2$ can lead to enhanced stabilization of reaction intermediates at the metal-metal oxide interface, compared to when the metal catalyst is used alone. Further, $TiO_2$ is a relatively economical and abundant metal oxide that has been widely studied for its photoactivity and electronic structure. Composites with CNTs were selected because the intrinsic properties of CNTs (i.e., excellent electron transport) were expected to provide a support with relatively lower electrical resistance.

For the NO3RR, copper (Cu) was integrated into each support via electrodeposition, choosing a single metal catalyst because prior studies have attributed significant activity for the NO3RR with a monometallic catalyst to contributions from the support material. Copper was selected as a common coinage metal that is more abundant than more conventional platinum group metals (PGMs), and copper also has been shown to demonstrate promising performance in electrocatalytic NO3RR based on high NH3 selectivity and Faradaic efficiency. The electronic structure of Cu, specifically the filled d orbital ($[Ar]3d^{10}\ 4s^1$), provides ideal energies to react with the high energy of the LUMO of $NO_3^-$. Moreover, Cu shows enhanced performance for the NO3RR when combined with $TiO_2$ containing oxygen vacancies.

Results presented in the following explore the NO3RR mechanism, rate, and product selectivity using three different CNF supports, both with and without Cu as a catalyst. NO3RR was carried out in neutral pH at a nitrate concentration high enough to probe support contributions and low enough to maintain environmental relevance. Many material-focused studies conducted in acidic or alkaline conditions or at extreme nitrate concentrations (i.e., gram per liter) may not reflect accurate performance for environmental applications given that the electrocatalytic NO3RR selectivity and product yield depends on bulk pH and nitrate concentration. Each Cu loaded CNF support exhibited unique NO3RR performance and product selectivity. Evidence suggests that differences observed across the three Cu-deposited CNF supports are not attributable to differences in the loading or morphology of the deposited Cu, suggesting the nature of the support actively influences the NO3RR mechanism; indeed, monometallic catalysts, such as Cu, have little to no activity for the NO3RR without contribution from the support material.

The term "titanium compound" as used herein includes any compound that comprises titanium and that is suitable for preparing an electrode of the invention. In one embodiment, the titanium compound is a titanium oxide In one embodiment, the titanium compound is a titanium dioxide or a doped form of a titanium dioxide. In one embodiment, the titanium compound is a titanium-based perovskite. In one embodiment, the titanium compound is titanium dioxide in pure form (e.g., greater that 95% or greater than 99% pure). In one embodiment, the titanium compound is one of the titanium dioxide materials identified in the Example herein.

In one embodiment the invention provides preparing a water permeable substrate that comprises electro spun nanofibers and that includes a titanium compound, such as titanium dioxide, for example, disposed thereon or therein by electrospinning polymer fibers from a sol-gel comprising the titanium compound, a polymer precursor, and a suspending solvent to provide the water permeable substrate that comprises electro spun nanofibers and that has the titanium compound disposed thereon or therein. The polymer precursor can be any material that can be used to generate the carbonaceous water permeable substrates described herein. In one embodiment, the polymer precursor is polyacrylonitrile (PAN).

In one embodiment, the invention provides for depositing a metal catalyst into or onto the carbonaceous water permeable substrate having a titanium compound disposed thereon or therein to provide a carbonaceous water permeable substrate having the titanium compound and a metal catalyst disposed thereon or therein. In one embodiment, the metal catalyst can be deposited onto or into the carbonaceous water permeable substrate having a titanium compound disposed thereon or therein by electrodeposition of the metal catalyst. In another embodiment, the metal catalyst can be deposited onto or into the carbonaceous water permeable substrate having a titanium compound disposed thereon or therein using an incipient wetness impregnation method, which includes contacting the carbonaceous water permeable substrate having a titanium compound disposed thereon or therein with a metal salt (e.g., a solution of a metal salt), followed by drying, calcination under an inert atmosphere (e.g., $N_2$) and subsequent reduction under $H_2$ at an elevated temperature. For example, as described in the Example herein, an aliquot of $Cu(NO_3)_2 \cdot 3H_2O$ solution that equals the pore volume can be added to the carbonaceous water permeable substrate having a titanium compound, such as titanium dioxide, for example, disposed thereon or therein. The $Cu(NO_3)_2$ loaded carbonaceous water permeable substrate having a titanium compound disposed thereon or therein is then dried in air (e.g., at 60° C. for 12 hours), calcined (e.g., under a $N_2$ flow at 220 mL min$^{-1}$ for 3 hours at 400° C.), and reduced (e.g., under $H_2$ flow also at 220 mL min$^{-1}$ for 3 hours). When the metal catalyst is deposited onto or into the carbonaceous water permeable substrate having a titanium compound disposed thereon or therein using the incipient wetness impregnation method, the oxygen vacancies (OVs) can be increased during the reduction under $H_2$, without the need for an additional heating step to increase the oxygen vacancies.

Figure 8:
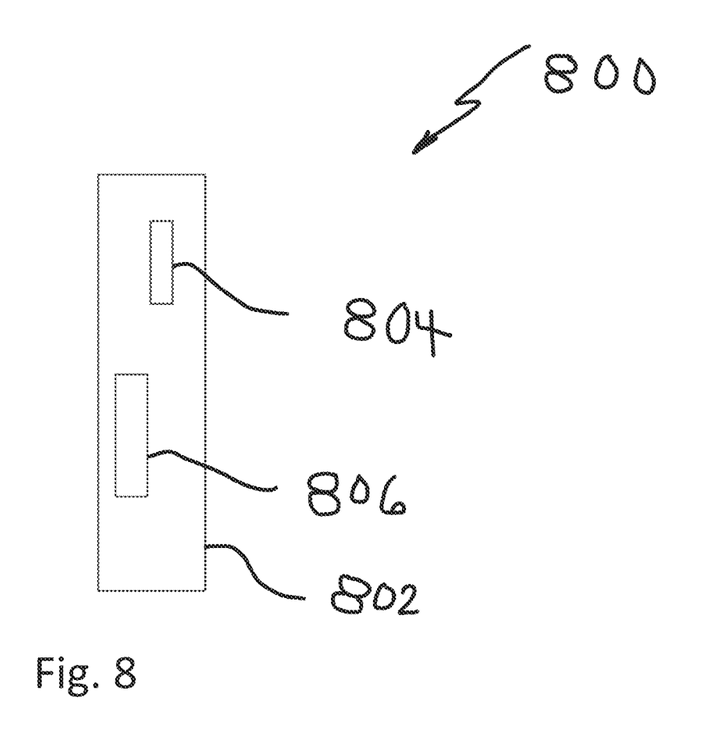
FIG. 8 shows an illustration/block diagram of a nitrate reducing electrode in accordance with some embodiments of the present disclosure.

FIG. 8 shows an illustration/block diagram of a nitrate reducing electrode 800 in accordance with some embodiments of the present disclosure. The nitrate reducing electrode 800 includes a carbonaceous water permeable substrate 802 having disposed thereon or therein a titanium compound 804 and a metal catalyst 806. The carbonaceous water permeable substrate 802, the titanium compound 804, and the metal catalyst 806 are described above. Also, as described above, other materials, such as carbon nanotubes, for example, may be substituted for the titanium dioxide 804.

The invention will now be illustrated by the following non-limiting example.

Example 1

Electrode Synthesis:

CNF electrodes were produced via the carbonization of electro spun polymer fibers. Polymer fibers were derived from a sol-gel containing the polymer precursor, polyacrylonitrile (PAN), and the suspending solvent, N,N-dimethylformamide (DMF). To the above solution, phthalic acid (PTA) was included to improve solution stability and to provide fiber porosity. All sol-gels were prepared with a PAN concentration of 8 wt % relative to total sol-gel mass. To produce composite CNFs, $TiO_2$ nanoparticles (Evonik P25; approximately 75% anatase/25% rutile) or unfunctionalized multi-walled carbon nanotubes (CNTs; CheapTubes) were added to the sol-gel containing DMF and PTA, prior to the addition of PAN. Sol-gels to produce CNF/$TiO_2$ composites contained 0.45 g PAN and 0.45 g $TiO_2$. Sol gels to produce CNF/CNT composites contained 0.90 g PAN and 0.27 g CNT. Electrospun PAN nanofibers were converted to CNFs using a two-step thermal treatment process that first involved oxidative stabilization in the air at 250° C. for 2.5 h, followed by carbonization in nitrogen at 1000° C. for 1 h. This process resulted in three distinct catalyst supports, CNF, CNF/$TiO_2$, and CNF/CNT, that were used as electrodes for nitrate and nitrite reduction.

Copper (Cu) Deposition on CNF Electrodes

Copper was electrochemically deposited on substrates using a three-electrode system at room temperature, where the CNF or CNF composite served as the working electrode (WE), Ag/AgCl was the reference electrode (RE), and a platinum wire was used as the counter electrode (CE). CNF-based working electrodes were secured between two glass slides with insulating tape, where one glass slide was e-beam deposited with titanium (10 nm) and gold (80 nm) to form a conductive surface for connection to the external circuit. All deposition reactions occurred on a CNF-based electrode cut to 1.0×2.0 cm, where 1.0×1.5 cm was directly exposed to the deposition solution. This resulted in a total geometric area of 3.0 cm$^2$ exposed for deposition, which includes the material front and back.

The Cu deposition solution (0.3 M $CuSO_4$+0.1 M $H_3BO_3$, pH 2.0) contained a high Cu concentration to minimize mass and charge transfer limitations given the high surface area of the CNF-based electrodes (relative to traditional planar substrates). $H_3BO_3$ and pH 2.0 were used to increase $H^+$ concentration. The CNF-based electrodes were submersed in approximately 25 mL of the deposition solution contained in an open beaker for the deposition. Unlike many carbon felts and foams, the CNFs did not require any pretreatment to improve wettability prior to electrochemical deposition due to their intrinsic hydrophilicity.

Copper deposition was conducted at a constant potential (−0.20 V vs. Ag/AgCl), where the optimal deposition potential was first determined by linear sweep voltammetry (LSV; 2 mV s$^{-1}$). The deposition reaction was allowed to proceed until a certain amount of charge (|Q|=0.229 C, 0.458 C) was passed. Following the deposition, samples were cut from the sample holder to the final dimensions (1.0×1.5 cm). Finally, deposited samples were rinsed with and placed in DI overnight to remove any residual Cu from the high-concentration deposition solution remaining within the CNF matrix.

Exploring the Influence of $TiO_2$ Crystal Structure on Reactivity

Eight different $TiO_2$ nanopowders, which varied by crystal ratio (0-100 wt % anatase) and mean particle diameter (5-50 nm), were selected to synthesize eight different CNF/$TiO_2$ formulations (see Table 1). Seven of the $TiO_2$ nanopowders were received from US Research Nanomaterials, Inc. The 75% vol anatase nanopowder (i.e., P25) was received from Thermo Fischer Scientific. Hereafter, each composite CNF will be identified as "CNF/TiO2-XXA-XXnm" to specify the crystal ratio ("XXA") and mean particle diameter ("XXnm") of the pristine (i.e., as received by the vendor) TiO2 nanopowder added to the sol-gel for electrospinning.

TABLE 1

The crystal phase composition and average particle diameter for the pristine $TiO_2$ nanopowders used to fabricate CNF/$TiO_2$. Product descriptor as provided by the vendor.

| Anatase Composition (% vol) | Rutile Composition (% vol) | Average Particle Diameter (nm) | Product Descriptor |
|---|---|---|---|
| 0 | 100 | 30 | US3520 |
| 20 | 80 | 20 | US1020F |
| 50 | 50 | 20 | US1019F |
| 75 | 25 | 20 | Aeroxide ® P25 |
| 80 | 20 | 20 | US3500 |
| 100 | 0 | 5 | US3838 |
| 100 | 0 | 15 | US3492 |
| 100 | 0 | 30 | US3498 |

Influence of $TiO_2$ Heat Treatment Under $H_2$ Flow

Cu was selected for deposition on $TiO_2$/CNFs using incipient wetness impregnation. The size of each piece of $TiO_2$/CNF was 2.5 cm×2.0 cm (L×W). The desired concentration of Cu precursor solution was determined based on the pore volume (~200 µL) of $TiO_2$/CNF and a target Cu loading of ~2 wt. %, and the solutions were prepared by dissolving $Cu(NO_3)_2 \cdot 3H_2O$ in ultrapure water. An aliquot of the as-prepared $Cu(NO_3)_2 \cdot 3H_2O$ solution that equals the pore volume was then added dropwise to the $TiO_2$/CNF. The $Cu(NO_3)_2$ loaded $TiO_2$/CNF was then dried in air at 60° C. for 12 h, calcined under a $N_2$ flow at 220 mL min$^{-1}$ for 3 h at 400° C., and reduced under $H_2$ flow also at 220 mL min$^{-1}$ for 3 h at one of four elevated temperatures, all in a tube furnace. For 50% $TiO_2$/CNFs, four reduction temperatures (i.e., 400° C., 500° C., 600° C., and 700° C.) were used as different temperatures were hypothesized to create proportional amounts of oxygen vacancies (OVs) and promote reaction accordingly, while for 25% $TiO_2$/CNF and 0% $TiO_2$/CNF only 700° C. was used for reduction. Also, one piece of 50% $TiO_2$/CNF was first heated at 700° C. in $H_2$ flow and then deposited with Cu using the aforementioned incipient wetness impregnation method with calcination and reduction temperature at 400° C. for comparison. Additionally, 50% $TiO_2$/CNF without Cu deposition was also heated under $H_2$ flow at 400° C. and 700° C., respectively, while 25% $TiO_2$/CNF and 0% $TiO_2$/CNF without Cu deposition were heated under $H_2$ flow at 700° C., all as controls for comparison to materials with Cu deposition. A list of electrode materials and their reduction temperatures in $H_2$ flow are shown in Table 2.

TABLE 2

Different $TiO_2$/CNF Electrodes Synthesized and Temperatures Used for Heat Treatment under $H_2$ Flow

| Electrode | Heating Temperature in $H_2$ Flow (° C.) |
|---|---|
| Cu/50% $TiO_2$/CNF@700 C./400 C. | 50% $TiO_2$/CNF first heated at 700° C.; Cu then reduced at 400° C. |
| Cu/50% $TiO_2$/CNF@400 C. | 400 |
| Cu/50% $TiO_2$/CNF@500 C. | 500 |
| Cu/50% $TiO_2$/CNF@600 C. | 600 |
| Cu/50% $TiO_2$/CNF@700 C. | 700 |
| Cu/25% $TiO_2$/CNF@700 C. | 700 |
| Cu/0% $TiO_2$/CNF@700 C. | 700 |
| 50% $TiO_2$/CNF@400 C. | 400 |
| 50% $TiO_2$/CNF@700 C. | 700 |
| 25% $TiO_2$/CNF@700 C. | 700 |
| 0% $TiO_2$/CNF@700 C. | 700 |

CNF Support Characteristics

Figures 1A, 1C:
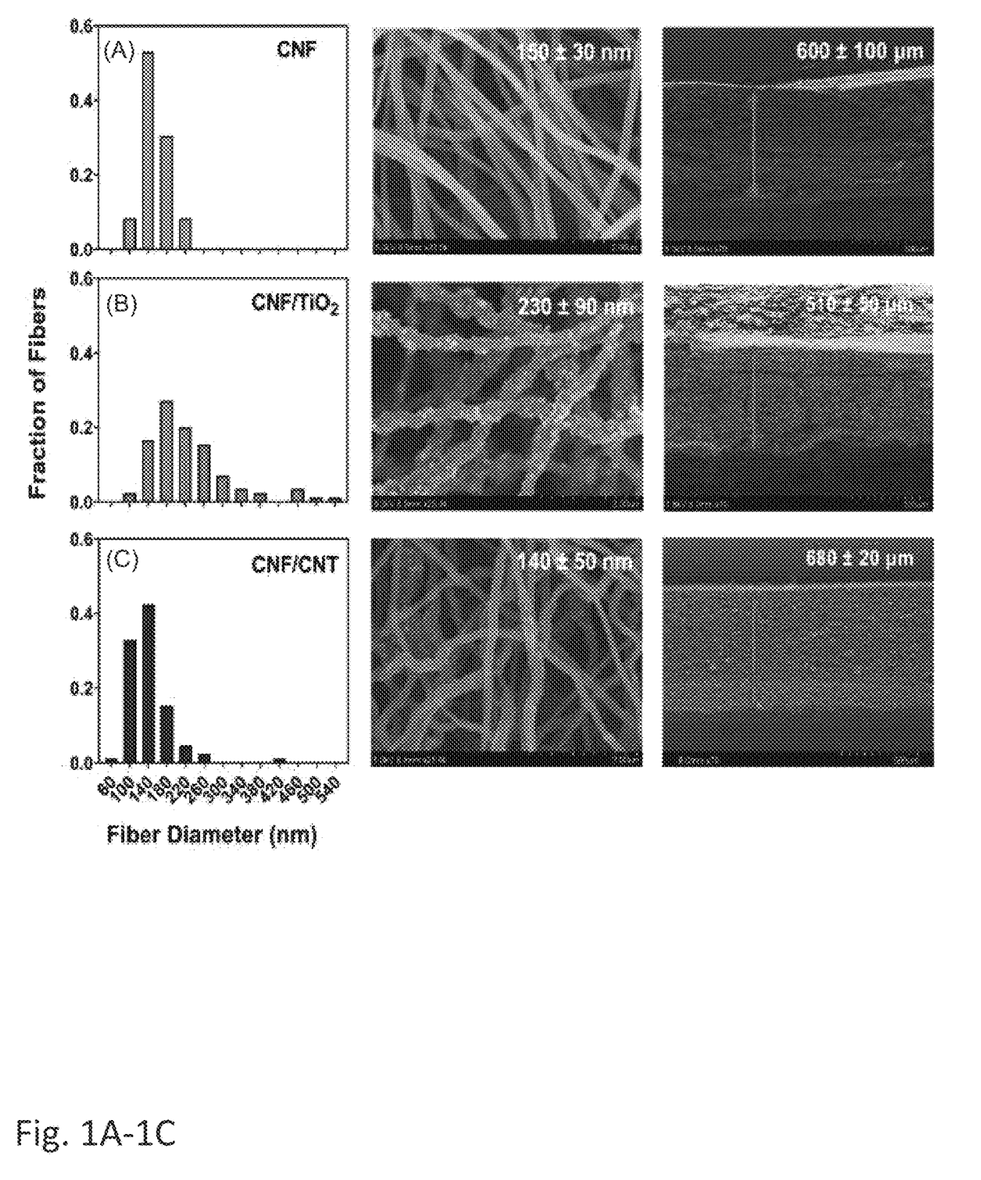

Bulk structure. FIG. 1 displays top-view and cross-sectional SEM images of CNF, CNF/$TiO_2$, and CNF/CNT substrates after carbonization at 1000° C. Also shown are the corresponding histograms of nanofiber diameter in each material, based on analysis of n=85 individual fibers for each. Average fiber diameter increased 1.5-fold from CNF (150±30 nm) to CNF/$TiO_2$ (230±90 nm). In contrast, average fiber diameters for CNF and CNF/CNT were similar at 150±30 nm and 140±50 nm, respectively. Unlike CNF and CNF/CNT, CNF/$TiO_2$ exhibited a markedly different fiber surface and a relatively wide deviation in fiber diameters due to $TiO_2$ aggregates within the bulk and at the surface of the fibers. The electrode bulk thickness varied from 500 to 700 m for all three CNFs. CNF (600±100 µm) had relatively similar thicknesses (within the standard deviation) compared to CNF/$TiO_2$ (510±50 µm) and CNF/CNT (680±20 m).

Table 3 shows the specific surface area and pore volume (PV) results determined from $N_2$ Brunauer-Emmett-Teller (BET) adsorption isotherms with each CNF-based electrode. CNF/$TiO_2$ had the highest BET surface area ($S_{BET}$; 54±1 m$^2$ g$^{\pm 1}$) followed closely by CNF/CNT (47±3 m$^2$ g$^{-1}$). Relative to CNF, the $S_{BET}$ increased 5-fold for CNF/$TiO_2$ and over 4-fold for CNF/CNT, CNF/CNT (0.16±0.006 cm$^3$ g$^{-1}$) had the greatest total PV followed by CNF/$TiO_2$ (0.10±0.001 cm$^3$ g$^{\pm 1}$). CNF/$TiO_2$ and CNF/CNT had similar pore size distributions with over 90% of the volume composed of mesopores, but CNF/CNT had a greater proportion of macropores (5±0.6%) than CNF/$TiO_2$ (3±1%). CNF/CNT also had an average mesopore diameter over 4-fold greater than that for CNF/$TiO_2$ (9 versus 2 nm, respectively). CNF/CNT possessed a smaller $S_{BET}$ and greater total PV relative to CNF/$TiO_2$ presumably because of its larger pores (i.e., a smaller surface-area-to-volume ratio) and/or less surface roughness. However, plain CNFs had the smallest total PV (0.02±0.005 cm$^3$ g$^{-1}$), an order of magnitude smaller than for CNF/CNT and CNF/$TiO_2$. which corresponds to its relatively low $S_{BET}$. Compared to CNF/$TiO_2$ and CNF/CNT, CNF had a pore size distribution with less volume attributed to mesopores (86±5%) and more volume attributed to micropores (5±1%) and macropores (9±5%). Notably, the relatively small surface area and total PV for CNF suggests that the higher surface area and total PV for CNF/$TiO_2$ and CNF/CNT resulted from the inclusion of their secondary components with high specific surface area (i.e., $TiO_2$, CNTs).

TABLE 3

Specific surface area and pore volume analysis for CNF, CNF/$TiO_2$, and CNF/CNT supports obtained from the $N_2$ adsorption-desorption isotherms.

| CNF Support | Specific Surface Area (m$^2$ g$^{-1}$) | | | | $V_{tot}$ (cm$^3$ g$^{-1}$) | Pore Volume Distribution (%) | | |
|---|---|---|---|---|---|---|---|---|
| | $S_{BET}$ | $S_{EXT}$ | $S_{micro}$ | $S_{meso}$ | | Micropore | Mesopore | Macropore |
| CNF | 11 ± 1 | 9 ± 1 | 2 ± 0.1 | 6 ± 0.1 | 0.02 ± 0.005 | 5 ± 1 | 86 ± 5 | 9 ± 5 |
| CNF/$TiO_2$ | 54 ± 1 | 47 ± 2 | 7 ± 3 | 50 ± 4 | 0.10 ± 0.001 | 3 ± 2 | 94 ± 3 | 3 ± 1 |
| CNF/CNT | 47 ± 3 | 41 ± 2 | 7 ± 2 | 31 ± 2 | 0.16 ± 0.006 | 2 ± 0.4 | 92 ± 0.2 | 5 ± 0.6 |

$S_{BET}$, Multi-point BET
$S_{EXT}$, External surface area (t-area) via the V-t method
$S_{micro}$, Microporous surface area where $S_{micro} = S_{BET} - S_{EXT}$
$S_{meso}$, Mesoporous surface area via the BJH method
$V_{tot}$, Total pore volume estimated at $P/P_0 \approx 0.95$ Electrochemical characterization. Electrochemical characterization results from PEIS measurements are presented in Table 4. All CNF-based electrodes exhibited comparable and relatively low geometric (areal) resistances (Ω-cm$^2$)

TABLE 4

Geometric (areal) resistance (Ω-cm$^2$) for each CNF composite resulting from PEIS data as fit with the Simple Randles model circuit (see Error! Reference source not found.).

| CNF Support | Geometric Resistance (Ω-cm$^2$) | | |
|---|---|---|---|
| | $R_{ct}$ | $R_{tot}$ | $R_{ohm}$ |
| CNF | 8 (±4) | 14 (±4) | 6 (±1) |
| CNF/TiO$_2$ | 12 (±2) | 19 (±1) | 7 (±1) |
| CNF/CNT | 7 (±2) | 11 (±2) | 6 (±1) |

Cu Deposition Characterization Across Different CNF Supports

All three CNF supports exhibited similar current-time ($J_{geo}$ versus t) profiles during electrochemical copper deposition. The deposition current was greatest (i.e., most negative) at initial potential onset, steadily reached a minimum, and then increased to a near-constant current at later times. Although the CNF-based electrodes exhibited some differences in fiber morphologies (e.g., fiber diameters, surface areas, pore size distributions) and composition (i.e., TiO$_2$ and CNT composites), ICP-MS analysis of acid digested materials after Cu deposition revealed consistent mass loadings of deposited Cu across all three electrodes (0.10±0.02 mg Cu). The amount of deposited Cu determined experimentally by ICP-MS analysis was compared to the maximum theoretical Cu loading, which was estimated by the total charge passed during deposition (i.e., 0.458 C). Assuming a Cu valency of two (Cu$^{2+}$), the theoretical maximum amount of Cu deposited on the CNF (0.1508 mg Cu) is greater than what was measured via ICP-MS across all CNF substrates (0.10±0.02 mg Cu). Overall, this suggests a relatively efficient electrodeposition process (~70%).

NO3RR and NO2RR Current-Voltage Relationships

Figure 2:
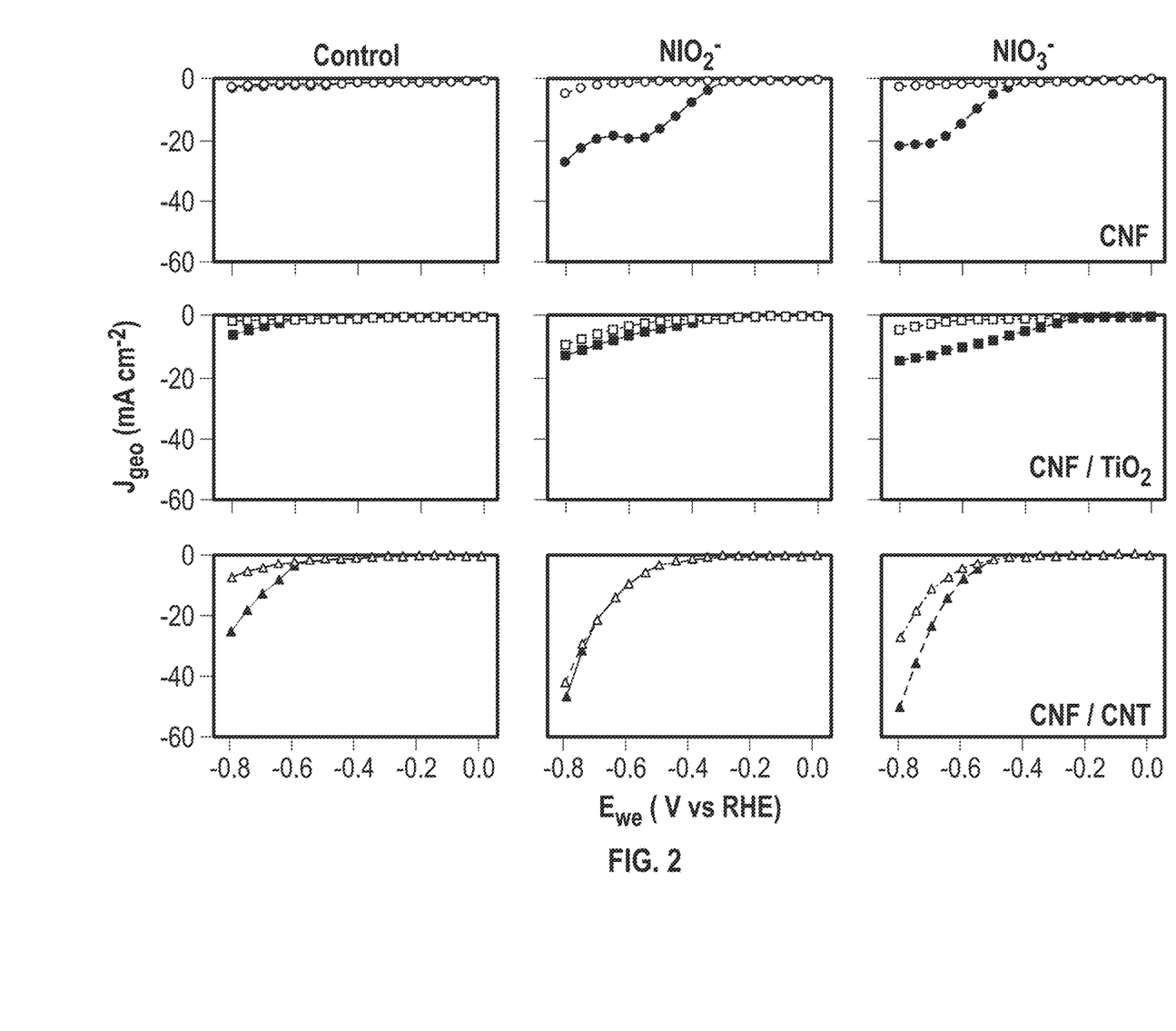
FIG. 2: Current density-voltage profiles ($J_{geo}$ versus $E_{we}$) from SCV in the N-free control electrolyte (left), $NO_2^-$ (middle), and $NO_3^-$ (left) systems for the CNF supports (CNF, CNF/$TiO_2$, CNF/CNT) with (■) and without (□) Cu.

The current density-voltage relationships ($J_{geo}$ versus $E_{we}$) from SCV provided insight into the reduction performance and reaction mechanism of each CNF composite (with and without copper) in the presence of NO$_2^-$ and NO$_3^-$, as well as in the N-free control electrolyte of SO$_4^{2-}$ (FIG. 2). In general, Cu-deposited CNF supports (solid symbols) generated more cathodic currents at less cathodic potentials than CNF supports without Cu (open symbols). All three Cu-deposited CNF electrodes exhibited improved cathodic currents in the presence of N-species when compared to the N-free control system (i.e., SO$_4^{2-}$ only; black line solid symbols). These observations indicate that Cu increases the electroactivity of the supports both in N- and N-free electrolytes and that nitrate and nitrite reduction currents become more apparent at less cathodic potentials compared to hydrogen evolution reaction in N-free sulfate electrolyte system.

CNF electrodes. For CNF electrodes without Cu, current density at all potentials was comparable for each electrolyte (NO$_2^-$ NO$_3^-$ and N-free SO$_4^{2-}$), suggesting that the cathodic currents observed is primarily due to hydrogen evolution reaction activity and that the CNF without Cu is not active for nitrate or nitrite reduction. With the addition of Cu to CNF, two observations were apparent: (1) significant increase in current densities in NO$_2^-$ and NO$_3^-$ electrolyte compared to N-free electrolyte, and (2) cathodic current densities for NO$_2$ and NO$_3$-electrolyte appearing at potentials far less cathodic compared to N-free electrolyte. For example, the geometric current density ($J_{geo}$) increased 8-fold in NO$_2^-$ and 9-fold in NO$_3^-$ with the addition of Cu at −0.69 V (the mass-transfer limited potential for CNF/Cu in N-based electrolytes) compared to CNF/Cu in N-free electrolyte and CNF without Cu in all electrolytes. The above observations unambiguously indicate that the CNF/Cu system is highly active for N-species reduction. Notably, while the onset potential ($E_{onset}$ is defined as the potential when $J_{geo}$=−0.5 mA cm$^{-2}$) for CNF/Cu system occurred at a less negative potential in NO$_3^-$ than NO$_2^-$, the electrodes showed a shift in peak potential to less-cathodic potentials for NO$_2$-compared to NO$_3^-$, indicating that the NO$_3^-$ reduction to NO$_2^-$ is the rate-limiting step. Further, since the HER activity was negligible at these potentials, we hypothesize that the nitrate reduction (and nitrite reduction) mechanism is primarily a proton coupled electron transfer reaction (PCET) and not hydrogenation of nitrogenous species.

CNF/TiO$_2$ electrodes. In contrast to CNF electrodes, CNF/TiO$_2$ without Cu generated considerable currents in the presence of NO$_2$ and NO$_3^-$ indicating that the TiO$_2$ on its own is active for nitrate and nitrite reduction. This is also supported by the minimal currents observed for CNF/TiO$_2$ in the N-control system across all potentials ($J_{geo}$=−1.4 mA cm$^2$ at −0.69 V). The CNF/TiO$_2$ (without Cu) showed enhanced kinetics (enhanced current densities for given potential) for NO$_2^-$ compared to NO$_3^-$, indicating that the NO$_3^-$ reduction to NO$_2^-$ is the rate-limiting step. With the addition of Cu, the cathode potential for nitrate and nitrite reduction shifted more positive indicating increased activity of CNF/TiO$_2$/Cu system for nitrate and nitrite reduction. Notably, the onset potential for nitrate reduction for CNF/TiO$_2$/Cu was more positive than the CNF/Cu electrode indicating that the addition of TiO$_2$ significantly lowered the activation barrier for nitrate reduction. This reduction in activation barrier could be due to increased stabilization of Cu$^+$ species which could aid in reducing the overpotential of the NO3RR and due to ability of TiO$_2$ to directly bind, reduce, and active nitrate at lower potentials. Furthermore, an increase in HER activity was also observed with Cu addition in N-free control electrolyte compared to CNF/Cu system.

CNF/CNT electrodes. For CNF/CNT electrodes, nitrate and nitrite reduction currents were similar with and without Cu indicating that the Cu did not significantly improve the nitrate and nitrite reduction activity. It should be noted that while the reduction currents were more apparent at less cathodic potentials for nitrate and nitrite compared to N-free control electrolyte, the CNF/CNT/Cu showed the highest HER activity in N-free control electrolyte compared to other electrodes. Nearly identical current density-relationships for nitrate and nitrite with and without Cu and increased HER currents in N-free control system, likely indicates that the CNF/CNT/Cu does not exhibit enhanced N reduction performance.

NO3RR Product Selectivity

The ionic products (NO$_2^-$, NH$_4^-$) quantified by IC and the gaseous product (H$_2$) quantified by GC provided a mass and charge balance from which selectivity and Faradaic efficiency (FE) was calculated. Note that N$_2$ is assumed to be the only other gaseous product formed during the NO3RR because nitrous oxide (N$_2$O) is only likely formed in high nitrate concentrations (>0.1 M) and/or acidic conditions. Further, microporous carbons have exhibited strong sorption for N$_2$O, which has been suggested to provide time for additional reduction (to N$_2$ via the Vooys-Koper Mechanism) if N$_2$O were to form. Moreover, N$_2$O was not detected when the method runtime was extended past the N$_2$O retention time for this GC system. Therefore, the mass of N$_2$ was calculated based on a complete charge balance after quantifying all other products (NO$_2^-$, NH$_4^+$, H$_2$).

Figure 3A:
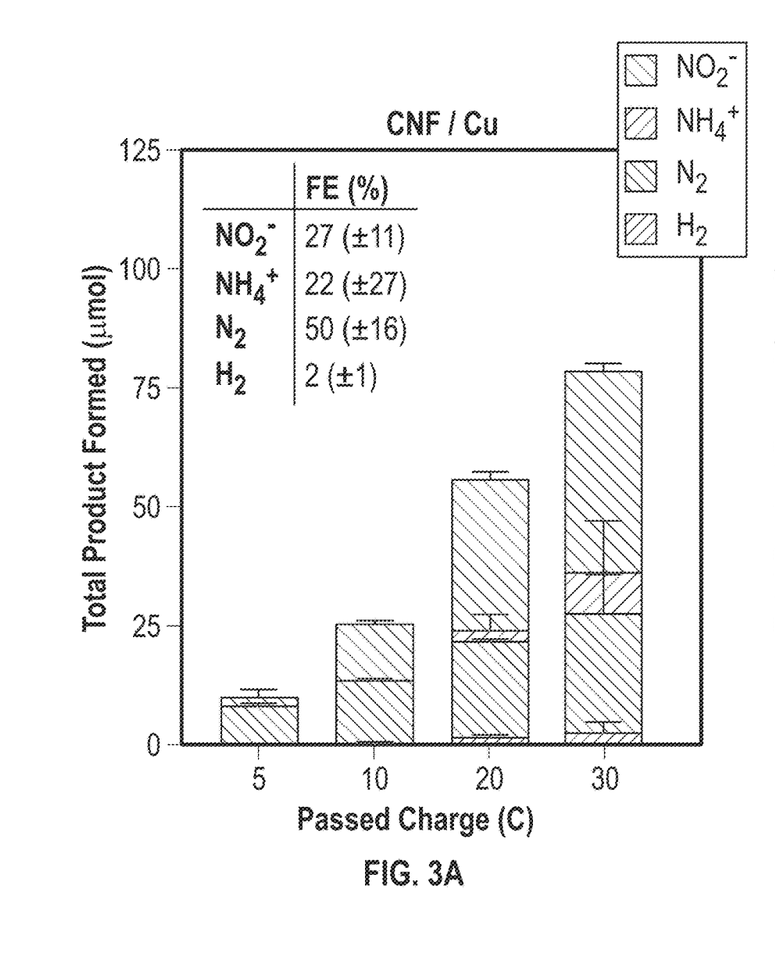
FIG. 3A and FIG. 3B: Average product distribution from nitrate ($NO_3^-$) reduction at −0.69 V vs RHE for (A) CNF/Cu and (B) CNF/$TiO_2$/Cu. Average Faradaic efficiencies (FE, %) for nitrite ($NO_2^-$), ammonium ($NH_4^+$), dinitrogen ($N_2$), and hydrogen ($H_2$) at 30 C are displayed in the inserts. Initial concentration: 500 ppm $NO_3^-$; supporting electrolyte: 0.1M $Na_2SO_4$, pH 7.0.
Figure 3B:
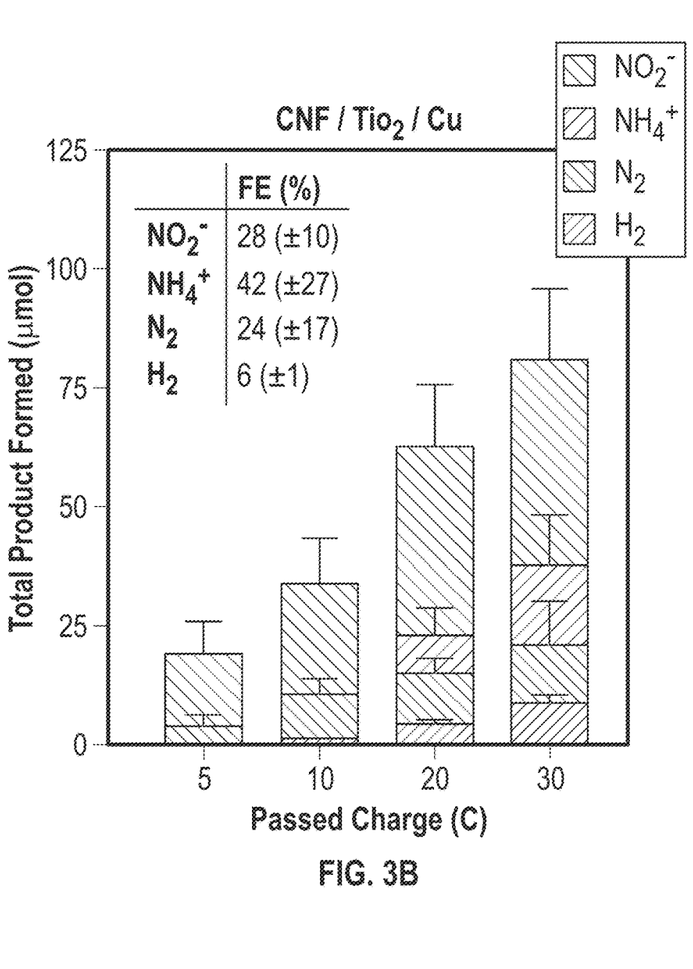

Product selectivity across CNF supports. FIG. 3 provides the product distribution resulting from ionic ($NO_2^-$ $NH_4^+$) and gaseous ($N_2$, $H_2$) products from NO3RR for CNF/Cu and CNF/TiO$_2$/Cu electrodes at −0.69 V vs RHE. Because the current profiles for CNF/CNT and CNF/CNT/Cu suggested an electrode with dominant HER (resulting in poor N reduction performance) only ionic species ($NO_2^-$, $NO_3^-$, $NH_4^+$) were quantified for these electrodes (data not shown). For all three CNF-based electrodes, $NO_2^-$ was the only ionic product detected when less than 20 C of total charge were passed. However, for total charges of 20 C or greater, $NH_4^+$ also formed, primarily in CNF/Cu and CNF/TiO$_2$/Cu systems. After a total charge of 30 C was passed, which was sufficient charge to generate a complete product distribution, CNF/TiO$_2$/Cu had the greatest selectivity and Faradaic efficiency (FE) for ionic reduction products ($NO_2^-$, $NH_4^+$). CNF/TiO$_2$/Cu and CNF/Cu had similar FE for $NO_2^-$, but CNF/TiO$_2$/Cu converted more $NO_3^-$ with less charge and provided greater FE for $NH_4^+$. However, as suggested by SCV profiles, HER was more prevalent with CNF/TiO$_2$/Cu (FE 6%) than with CNF/Cu (FE 2%); this may indicate that CNF/TiO$_2$/Cu NO3RR performance would depart from that for CNF/Cu at more negative potentials due to greater HER activity.

For CNF/CNT/Cu, relatively low product formation and FE confirmed HER was dominant, which was suggested in the current profiles. Compared to CNF/TiO$_2$/Cu, CNF/CNT/Cu produced over 3-fold less total ionic product. Highly ordered pyrolytic graphite (HOPG), a reasonable analog for CNTs, has demonstrated increased HER activity with a greater number of step edges and lattice defects. The apparent HER activity of CNF/CNTs may suggest that incorporating CNTs in the substrate introduced steps edges and defects not present in CNF.

Figure 4A:
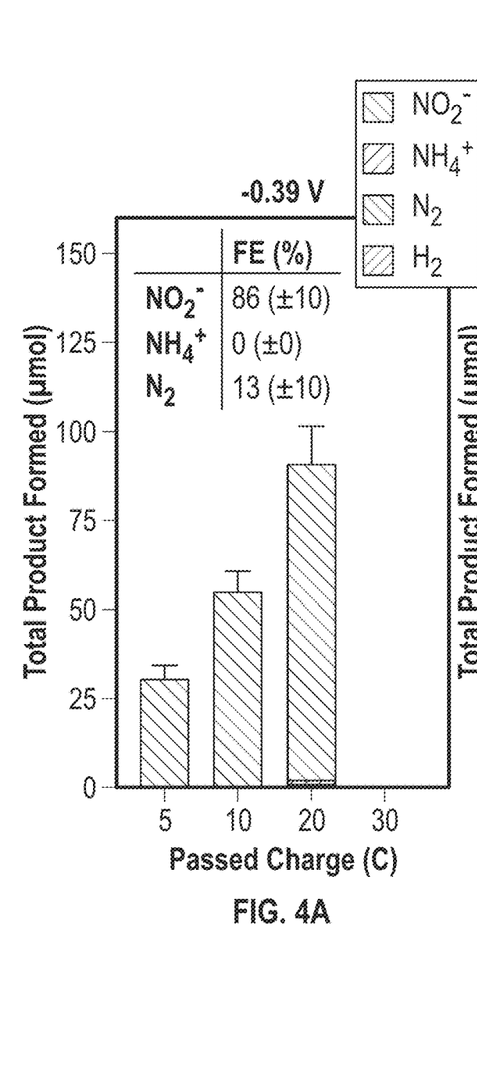
FIG. 4A, FIG. 4B, and FIG. 4C: Average product distribution from nitrate ($NO_3^-$) reduction for CNF/$TiO_2$/Cu at the applied potentials (A) −0.39 V, (B) −0.69 V, and (C) −0.79 V vs RHE. Average Faradaic efficiencies (FE, %) for nitrite ($NO_2^-$), ammonium ($NH_4^+$), and dinitrogen ($N_2$) are displayed in the insert. FE are reported at 20 C for −0.39 V and 30 C for −0.69 and −0.79 V. Deposition parameters: −0.2 V vs SCE, 0.458 C; initial concentration: 500 ppm $NO_3^-$; supporting electrolyte: 0.1M $Na_2SO_4$, pH 7.0.
Figure 4B:
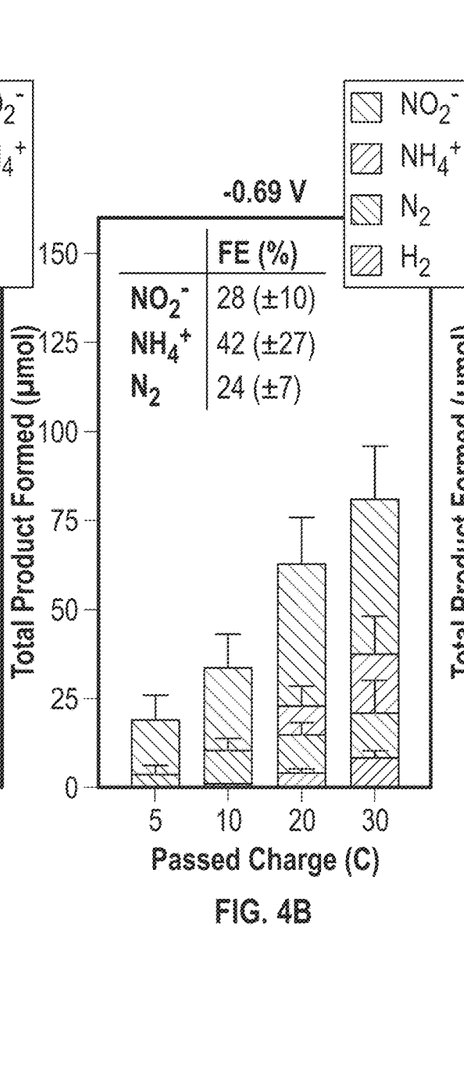
Figure 4C:
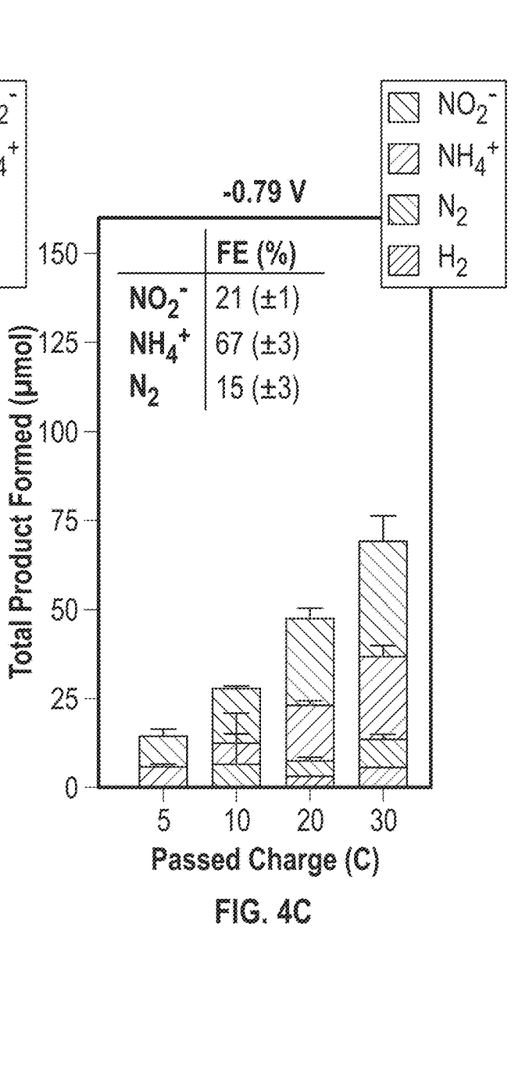

Product selectivity across applied potential. FIG. 4 displays the product distribution for ionic products ($NO_2^-$ $NH_4^+$) and gaseous products ($H_2$, $N_2$) as a function of applied potential (−0.39, −0.69, and −0.79 V vs RHE) for CNF/TiO$_2$/Cu. Note that potential dependent studies were conducted only with CNF/TiO$_2$/Cu due to its favored ammonium FE and selectivity relative to CNF/Cu and CNF/CNT/Cu. Only 20 C were passed for −0.39 V due to low current density. At −0.39 V, $NO_2^-$ was the dominant product with 86±10% FE at 20 C. Small amounts of $N_2$ and $H_2$ were generated (<15% FE combined), and no $NH_4^+$ was detected. The product distribution changed between −0.39 to −0.69 V, which corresponded to a nearly 7-fold increase in current density (e.g., $NH_4^+$ FE increased by 42% from −0.39 to −0.69 V). At −0.79 V, $NH_4^+$ consumes more charge to produce less overall product mass. Although HER became more prominent with increasingly negative potential, FE (67 f) and selectivity was greatest for $NH_4^+$ at −0.79 V. The observed shift in product distribution from primarily $NO_2^-$ (57% FE at −0.39 V) to primarily $NH_4^+$ (67% FE at −0.79 V) agrees well with trends observed elsewhere when using defective TiO$_2$ impregnated with Cu for NO3RR. In that work, a steady increase in $NH_4^+$ selectivity and decrease in $NO_2^-$ selectivity occurred with more negative potentials. Moreover, $NH_4^+$ formation confirms the expected Cu performance. Cu boasts high activity for the first rate-limiting reaction step and a small potential difference between $NO_2$ and $NO_3^-$ reduction while limiting the HER better than other metal catalysts. Moreover, Cu also performs well near the HER potential window because adsorbed hydrogen encourages $NH_3$ formation over $N_2$.

Product selectivity across copper loading. Ionic product distribution ($NO_2^-$, $NH_4^+$) was also explored as a function of Cu deposition (|Q|=0.229, 0.458 C). The Cu loadings selected here provided nearly identical ionic product distributions to suggest that the selected loadings do not influence the NO3RR kipetics or the product formation for CNF/TiO$_2$ supports.

Figure 5A:
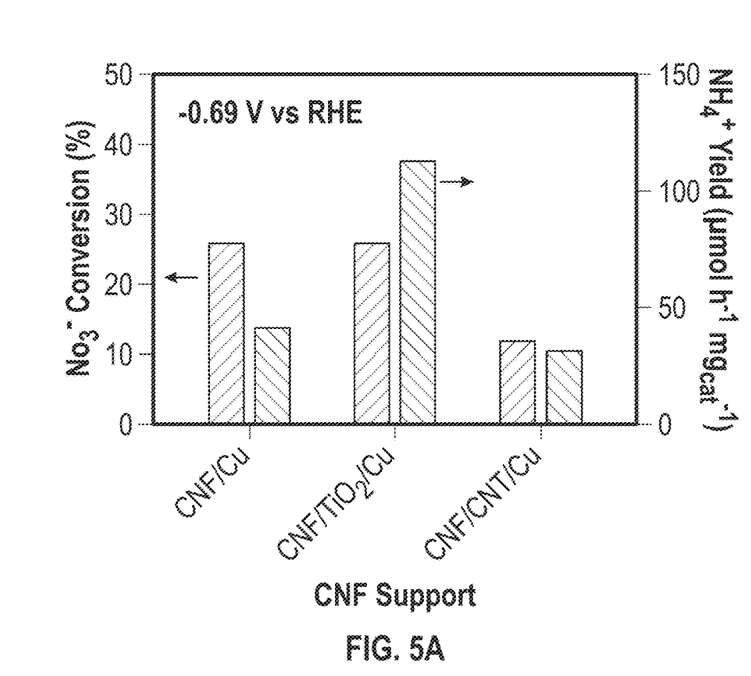
FIG. 5A and FIG. 5B: Average NH4+ yield at |Q|=30 C from $NO_3^-$ reduction for: (A) all three Cu-deposited CNF supports at −0.69 V vs RHE and (B) CNF/$TiO_2$/Cu at the different potentials (−0.39, −0.69, −0.79 V). Initial concentration: 500 ppm $NO_3^-$; supporting electrolyte: 0.1M $Na_2SO_4$, pH 7.0.
Figure 5B:
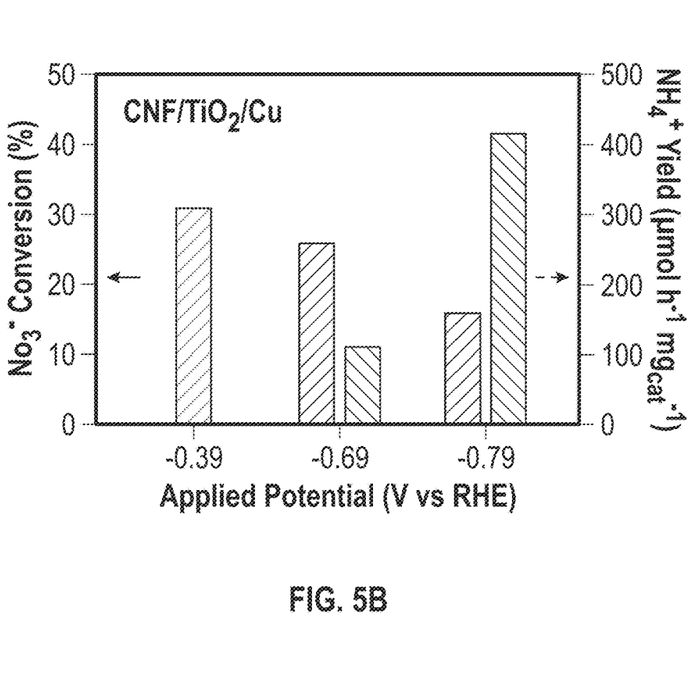

$NH_4^+$ yield across CNF supports and applied potential. FIG. 5A displays the $NH_4^+$ yield to quantify CNF support performance with respect to the catalyst loading (μmol h$^{-1}$ mg$_{cat}^{-1}$). CNF/TiO$_2$/Cu excels at $NH_4^+$ production relative to CNF/Cu and CNF/CNT/Cu, producing upwards of 115 μmol h$^1$ mg$_{cat}^{-1}$. Although CNF/CNT/Cu produces relatively low $NH_4^+$ mass (2 mol), CNF/CNT/Cu generates extremely high currents in a short amount of time to approach the $NH_4^+$ yield for CNF/Cu. FIG. 5B displays the $NH_4^+$ yield for CNF/TiO$_2$/Cu at different applied potentials. The $NH_4^+$ yield agrees with the trend in $NH_4^+$ mass produced, where more negative potentials produced the greatest $NH_4^+$ mass and the greatest yield. From −0.69 to −0.79 V, the $NH_4^+$ yield for CNF/TiO$_2$/Cu increased over 3-fold.

Long Term NO3RR Test

Figure 6:
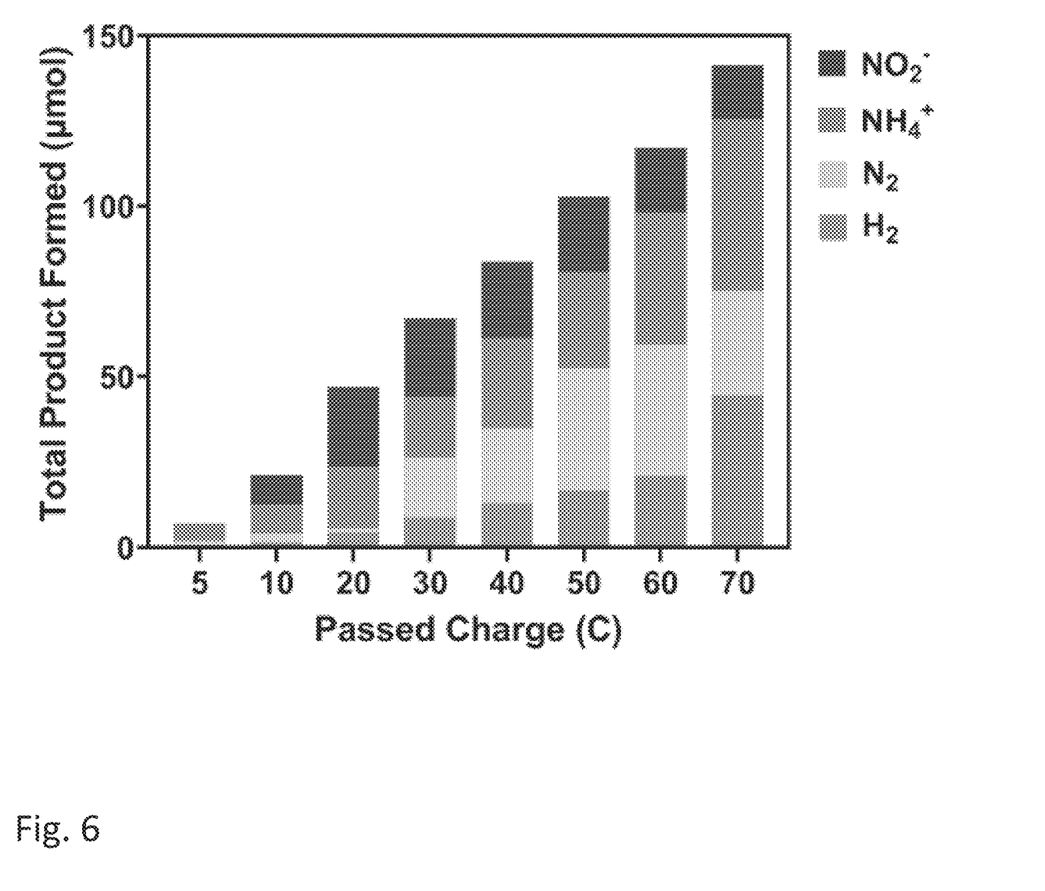
FIG. 6: Product distribution from nitrate ($NO_3^-$) reduction for $CNF/TiO_2/Cu$ at −0.69 V vs RHE for an extended duration (|Q|=70 C). Deposition parameters: −0.2 V vs SCE, 0.458 C; initial concentration: 500 ppm $NO_3^-$; supporting electrolyte: 0.1M $Na_2SO_4$, pH 7.0.

To examine the performance and stability of the CNF electrodes, CNF/TiO$_2$/Cu underwent a prolonged NO3RR period at −0.69 V. FIG. 6 displays the product distribution obtained with CNF/TiO$_2$/Cu as a function of extended passed charge. At the start (5 to 20 C), FE for NO2- increased with passed charge. However, FE for NO2- rapidly decreased after 20 C (from 22% at 20 C to 4% at 70 C), and NO2- mass was near constant with passed charge. This suggests that $NO_2^-$, which is identified as the first intermediate in the NO3RR pathway, was further reduced to the other end products (i.e., NH4+, N2). In fact, NH4+ was the only product with steadily increasing FE for the prolonged NO3RR experiment, where the maximum FE for NH4+ (55%) was obtained at 70 C. For H2, FE was relatively constant from 20 to 60 C (~5%). However, from 60 to 70 C, H2 increased more rapidly with a final FE of 12%. Similarly, FE for N2 was relatively constant over sustained passed charge (34±6% from 30 to 70 C).

Influence of TiO$_2$ Properties on Nitrate Reduction

The current density-voltage relationships ($J_{geo}$ versus $E_{we}$) obtained from staircase voltammetry (SCV) provided crucial insights into the reduction performance and reaction mechanism of selected CNF/TiO$_2$ formulations (with and without Cu) in the presence of $NO_2^-$ and $NO_3^-$.

Without Cu, CNF/TiO$_2$-XXA in $NO_3^-$ generated appreciable cathodic currents only at more cathodic potentials (more cathodic than −0.5 V vs RHE). Among the CNF/TiO$_2$-XXA formulations in $NO_3^-$, a clear trend of increasing cathodic currents (at a given potential) with increase in pristine anatase composition was observed. In $NO_2^-$, for all CNF/TiO$_2$-XXA formulations an immediate shift in cathodic potential to more positive was seen indicating that the reduction of adsorbed $NO_3^-$ to $NO_2^-$ is the rate limiting step. While the $NO_2^-$ reduction current-voltage profiles were similar for 0 A-30 nm, 50 A, and 75 A, the 100 A-30 nm showed sluggish $NO_2^-$ reduction kinetics compared to $NO_3^-$. While the reason for this observation on 100 A-30 nm (24 wt % A after carbonization) electrode is not fully understood, one hypothesis could be that the $NO_2^-$ binds more strongly on the anatase and could lower the H adsorption and subsequently the hydrogen evolution reaction (HER) currents.

With the addition of the Cu catalyst, all CNF/TiO$_2$-XXA showed a clear shift to less cathodic potentials for $NO_3^-$ and $NO_2^-$ reduction and demonstrated higher currents that approached 20 to 30 mA cm$^{-2}$. In $NO_3^-$, notably a mass transfer limited potential peak was observed only for 100

A-30 nm composition. The mass-transfer limited potential peak could originate due to competitive adsorption between $H^+$ and $NO_3^-$. For the remaining formulations, the trends in $NO_3^-$ current profiles for Cu-deposited samples did not suggest a dependence on the crystal phase composition as carbonized. However, the current profiles from the Cu-deposited formulations in $NO_2^-$ suggests a dependence on the $TiO_2$ crystal phase as carbonized. 0 A-30 nm and 100 A-30 nm had the greatest currents and the two lowest anatase compositions at 0 and 24 wt % A, respectively. Also, these electrodes showed a mass transfer limited peak indicating competitive adsorption between $H^+$ and $NO_2^-$. 100 A-30 nm also had the greatest increase in currents with the addition of Cu in $NO_2^-$. The next greatest currents were produced by 75 A, which corresponded to an anatase composition of 32 wt % A. The least currents were produced by 50 A, which corresponded to the greatest anatase composition 45 wt % A. 50 A had almost identical currents with and without Cu in $NO_2^-$.

For CNF/$TiO_2$-100 A-XXnm without Cu in $NO_3^-$, we observed increased reduction currents for 30 nm compared to 5 nm and 15 nm. With the addition of Cu, 100 A-30 nm samples showed higher reduction currents for both $NO_3^-$ and $NO_2^-$ and also showed clear mass transfer limited peak potentials. Interestingly, the 15 nm sample showed significant increase in $NO_3^-$ reduction currents at potentials more cathodic than −0.6 V which could be attributed to increase in hydrogenation of reduced $NO_3^-$ species as we don't see any evidence of increase in HER activity at these potentials without Cu.

Figure 7:
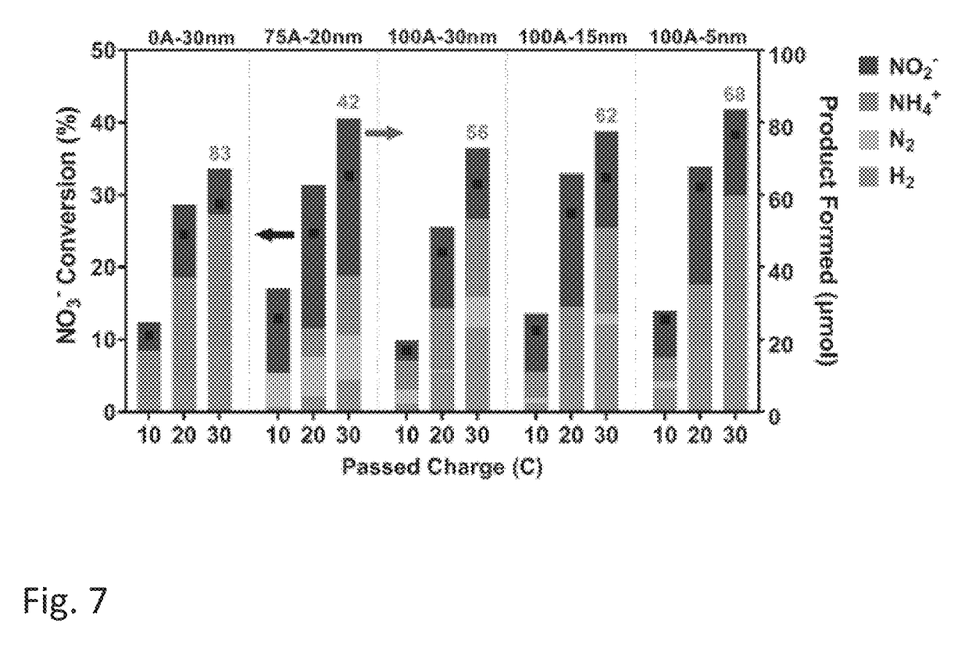
FIG. 7: Product distribution (right axis) and $NO_3^-$ conversion (left axis) from the $NO_3^-$ reduction reaction for select $CNF/TiO_2$-100 A-XXnm formulations at −0.69 V vs RHE. Faradaic efficiency (FE, %) for ammonium ($NH_4^+$) at 30 C is positioned above the corresponding bar. Initial concentration: 500 ppm $NO_3$; supporting electrolyte: 0.1M $Na_2SO_4$, pH 7.0.

Influence of $TiO_2$ Properties on Nitrate Reduction Reaction Product Selectivity FIG. 7 displays the $NO_3^-$ reduction product distribution for select CNF/$TiO_2$-XXA-XXnm formulations at an applied potential of −0.69 V vs. RHE. For 100 A-XXA formulations, as the pristine particle size decreases, the total $NO_3^-$ reduction product fairly remains the same but $H_2$ production increases; the total FE for $NH_4^+$ (and likely $H_2$) increases. For 100 A-5 nm, this observed increase in FE for $NH_4^+$ could be attributed to greater $H_2$ production and/or enhanced metal/support interaction due to nano-size effects. In fact, the $NO_3^-$ conversion from 100 A-30 nm to 100 A-5 nm increases by about 7%, which we attribute to increased $H_2$ formation (only a 2e$^-$ process) and no $N_2$ formation. For similar pristine diameters (20-30 nm), all rutile (i.e., 0 A-30 nm) is better than the remaining anatase-containing formulations in almost all aspects. For 0 A-30 nm, $NH_4^+$FE (83%) and moles produced is greater than all other formulations tested for NO3RR. This indicates 0 A-30 nm can suppress HER much more effectively and may enhance metal/support interaction. From the formulations tested for $NO_3^-$ reduction, 75 A-20 nm and 100 A-30 nm had the most similar product distributions and FE for $NH_4^+$, which reinforces their similar anatase composition after heat treatment and may suggest similar metal/support.

Influence of $TiO_2$ Heat Treatment under $H_2$ Flow on Nitrate Reduction Reaction For heat treated materials, the electrocatalytic nitrate reduction experiments were conducted in the filterpress flow reactor described in Yan et al. (Chenxu Yan, Sruthi Kakuturu, Ashley Hesterberg Butzlaff, David M. Cwiertny, Syed Mubeen, and Charles J. Werth, Scalable Reactor Design for Electrocatalytic Nitrite Reduction with Minimal Mass Transfer Limitations. ACS Environmental Science & Technology: Engineering 2021, 1, 2, 204-215. With higher heat treatment temperatures, the activity, Faradaic efficiency, and $NH_4^+$ selectivity of Cu/$TiO_2$/CNFs generally increase. Similarly, with increasing $TiO_2$ loading from 0% to 50%, the activity, Faradaic efficiency and $NH_4^+$ selectivity also increase. The Cu/50% $TiO_2$/CNF@700 C was, therefore, the best-performing Cu/$TiO_2$/CNF electrode and exhibited the highest activity of 5.8 L $g_{Cu}^{-1}$ min$^{-1}$, Faradaic efficiency of 60%, and $NH_4^+$ selectivity of 93% at −0.30 V/RHE. A detailed comparison of the activity, Faradaic efficiency, $NH_4^+$ selectivity, and energy consumption of the electrodes described in this disclosure and other electrodes are listed in Table 5. As shown, the active-metal normalized activity of Cu/$TiO_2$/CNF@700 C was especially high, i.e., more than 10 times that of Cu/ACC, 8 times that of Cu 0.01% Pd/ACC and twice that of In/ACC. These results were unexpected. The highest Faradaic efficiency was 60%, compared to <45% for other electrodes evaluated, also leading to improved energy consumption. $NH_4^+$ selectivity was 93%, similar to 95% with Cu 0.01% Pd/ACC. The high activity for Cu/50% $TiO_2$/CNF@700 C in a flow reactor is similar to or better than some of the best catalysts evaluated for traditional catalytic nitrate/nitrite reduction using $H_2$ as reductant in a batch reactor, and much better than these same catalysts in a fixed-bed catalytic flow reactor due to $H_2$ mass transfer limitations in the latter.

TABLE 5

$NO_3^-$ Reduction Activity, Faradaic Efficiency, $NH_4^+$ Selectivity, and Energy Consumption of Cu/50% $TiO_2$/CNF@700 C., Cu 0.01% Pd/ACC, Cu/ACC, and In/ACC Electrodes

|  | Cu/50% $TiO_2$/ CNF@700 C. | Cu 0.01% Pd/ACC | Cu/ACC | In/ACC |
|---|---|---|---|---|
| Activity (L $g_{Cu/In}^{-1}$ min$^{-1}$) | 5.9 | 0.77 | 0.45 | 2.4 |
| Faradaic Efficiency | 60% | 45% | 39% | 20% |
| $NH_4^+$ Selectivity | 93% | 95% | 91% | 40% |
| Energy Consumption (kWh mole$^{-1}$ $NO_3^-$) | 0.69 | 0.93 | 1.08 | 2.2 |

The disclosure provided herein described electrodes for the nitrate reduction reaction that take advantages of metal/support interaction. Specifically, three different carbon nanofiber (CNF) analogs were fabricated using electrospinning and their performance was assessed for the electrochemical reduction of nitrate ($NO_3^-$) in buffered-neutral waters using a sustainable and cost-effective metal catalyst, copper (Cu). The three CNF composites were CNF/Cu, CNF/$TiO_2$/Cu, and CNF/CNT/Cu, with $TiO_2$ and CNT added to the CNF matrix during electrospinning and Cu deposited post-electrospinning using an electrodeposition technique. Despite having consistent catalyst mass loading and similar electrical resistance across all three supports, each CNF composite electrodes with Cu showed unique NO3RR performance and product distributions.

CNF/$TiO_2$/Cu showed the greatest Faradaic efficiency (FE) for the reduction of nitrate to $NH_4^+$ (42%) and transformed the most $NO_3^-$ (75 mol) after passing 30 C at −0.69 V vs RHE. This suggests that $TiO_2$ played a unique role in the NO3RR kinetics and mechanism. In contrast, CNF/CNT/Cu showed the highest currents and the lowest faradaic efficiency when operated at the same potentials, due to high hydrogen evolution activity that served as a detriment for NO3RR. Operando Raman spectroscopy on CNF/$TiO_2$/Cu indicate formation of hydrogenated nitrogenous species as the likely reason for increased selectivity for ammonia production.

The disclosure thus describes the unique performance of $TiO_2$-based materials for nitrate reduction, and provides new insights into the design and use of CNF supports as potential electroactive frameworks to boost the performance of electrocatalytic reduction of $NO_3^-$.

The above description is presented to enable a person skilled in the art to make and use the invention, and is provided in the context of a particular application and its requirements. Various modifications to the embodiments disclosed herein will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the disclosure may not show every benefit of the invention, considered broadly.

What is claimed:

1. A method comprising, heating a carbonaceous water permeable substrate having a titanium compound and a metal catalyst disposed thereon or therein to increase oxygen vacancies (OVs).

2. The method of claim 1, wherein the titanium compound comprises titanium dioxide.

3. The method of claim 1, wherein the carbonaceous water permeable substrate having a titanium compound and a metal catalyst disposed thereon or therein is heated to a temperature in the range of from about 400° C. to about 700° C.

4. The method of claim 1, wherein the carbonaceous water permeable substrate having a titanium compound and a metal catalyst disposed thereon or therein is heated in a reducing atmosphere that comprises H2.

5. A method comprising:
   preparing a water permeable substrate that comprises electro spun nanofibers and that has a titanium compound disposed thereon or therein by electrospinning polymer fibers from a sol-gel comprising the titanium compound, a polymer precursor, and a suspending solvent to provide the water permeable substrate that comprises electro spun nanofibers and that has the titanium compound disposed thereon or therein;
   oxidatively stabilizing the electro spun nanofibers by heating in air at about 250° C. to provide the water permeable substrate that comprises oxidatively stabilized electro spun nanofibers and that has the titanium compound disposed thereon or therein;
   heating the water permeable substrate that comprises oxidatively stabilized electro spun nanofibers and that has the titanium dioxide disposed thereon or therein to a temperature in a range of about 800° C. to about 1200° C. to carbonize the oxidatively stabilized nanofibers and to provide the carbonaceous water permeable substrate having the titanium compound disposed thereon or therein;
   depositing a metal catalyst onto the carbonaceous water permeable substrate having the titanium compound disposed thereon to provide the carbonaceous water permeable substrate having the titanium compound and the metal catalyst disposed thereon or therein;
   heating the carbonaceous water permeable substrate having the titanium compound and the metal catalyst disposed thereon or therein to increase oxygen vacancies to provide the carbonaceous water permeable substrate having increased oxygen vacancies and having the titanium compound and the metal catalyst disposed thereon or therein; and
   incorporating the carbonaceous water permeable substrate having increased oxygen vacancies and having the titanium compound and a metal catalyst disposed thereon or therein into an electrode.

6. The method of claim 5, wherein the polymer precursor comprises polyacrylonitrile.

7. A method comprising:
   forming a carbonaceous water permeable substrate having a titanium compound and a metal catalyst disposed thereon or therein; and
   introducing oxygen vacancies into the carbonaceous water permeable substrate.

8. The method of claim 7, comprising forming the carbonaceous water permeable substrate having the titanium compound and the metal catalyst disposed thereon or therein and heat treating the carbonaceous water permeable substrate having the titanium compound and the metal catalyst disposed thereon or therein.

* * * * *